(12) United States Patent
Burgin et al.

(10) Patent No.: US 8,798,815 B1
(45) Date of Patent: Aug. 5, 2014

(54) SYSTEM AND METHOD ALERTING AN AIRCREW OF THRESHOLD ALTITUDES

(71) Applicant: Honeywell International Inc., Morristown, NJ (US)

(72) Inventors: Roger W. Burgin, Scottsdale, AZ (US); Dave Pepitone, Sun City West, AZ (US); Jerry Ball, Peoria, AZ (US); Pramod Kumar Malviya, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/800,017

(22) Filed: Mar. 13, 2013

(51) Int. Cl.
 *G01C 5/00* (2006.01)
 *G05D 1/00* (2006.01)
 *G05D 3/00* (2006.01)
 *G06F 7/00* (2006.01)
 *G06F 17/00* (2006.01)
 *G01C 23/00* (2006.01)

(52) U.S. Cl.
 CPC .............. *G01C 5/005* (2013.01); *G01C 23/00* (2013.01)
 USPC .......................................................... 701/9

(58) Field of Classification Search
 USPC .......................................................... 701/9
 See application file for complete search history.

(56) References Cited

U.S. PATENT DOCUMENTS

| | | | |
|---|---|---|---|
| 5,798,712 A | 8/1998 | Coquin | |
| 6,401,038 B2 | 6/2002 | Gia | |
| 6,505,102 B2 | 1/2003 | Morizet et al. | |
| 6,707,394 B2 | 3/2004 | Ishihara et al. | |
| 6,710,723 B2 | 3/2004 | Muller et al. | |
| 6,826,459 B2 | 11/2004 | Conner et al. | |
| 7,205,906 B2 | 4/2007 | Johnson et al. | |
| 7,209,052 B2 | 4/2007 | Artini et al. | |
| 7,363,121 B1 | 4/2008 | Chen et al. | |
| 7,471,995 B1 | 12/2008 | Robinson | |
| 7,493,197 B2 | 2/2009 | Bitar et al. | |
| 7,570,177 B2 | 8/2009 | Reynolds et al. | |
| 7,714,744 B1 | 5/2010 | Wichgers | |
| 7,786,900 B2 | 8/2010 | Bitar et al. | |
| 7,881,866 B2 | 2/2011 | Meunier et al. | |
| 7,908,045 B1 | 3/2011 | McCusker | |
| 8,073,579 B2 | 12/2011 | Marty et al. | |
| 8,121,746 B2 | 2/2012 | Francois et al. | |
| 8,229,662 B2 | 7/2012 | Subelet et al. | |
| 2001/0023390 A1* | 9/2001 | Gia ............................... 701/301 |
| 2005/0258979 A1* | 11/2005 | Artini et al. .................... 340/970 |
| 2007/0129855 A1 | 6/2007 | Coulmeau | |
| 2010/0100308 A1 | 4/2010 | Coulmeau et al. | |
| 2010/0332054 A1* | 12/2010 | Brandao et al. .................... 701/3 |
| 2011/0172914 A1 | 7/2011 | Coulmeau et al. | |

* cited by examiner

*Primary Examiner* — Mary Cheung
*Assistant Examiner* — Anne Mazzara
(74) *Attorney, Agent, or Firm* — Ingrassia Fisher & Lorenz, P.C.

(57) ABSTRACT

A system and method display general terrain clearance awareness, whether the aircraft is off route, on airway, off procedure, or on procedure, so altitude thresholds are not violated and EGPWS alerts are avoided, while reducing clutter in displaying the information. Altitude, location, and rate of change in altitude are considered in determining whether the aircraft will exceed the threshold altitude. A flight path or an area to be entered is highlighted when the threshold altitude will be violated by the aircraft with the current flight path. The threshold altitude may be a minimum or maximum allowed altitude, or the terrain.

16 Claims, 10 Drawing Sheets

SYSTEM AND METHOD ALERTING AN AIRCREW OF THRESHOLD ALTITUDES

TECHNICAL FIELD

The exemplary embodiments described herein generally relates to aircraft navigation and more particularly to alerting an aircrew of threshold altitudes.

BACKGROUND

Modern map displays, particularly those used in aircraft for flight planning and monitoring, are capable of displaying a considerable amount of information such as terrain information and flight planning information. The terrain information may include situational awareness terrain and cautions that identify potential hazards. Flight planning information may include, for example, flight path and altitude information useful to the pilot.

These electronic instrumentation displays continue to advance in sophistication, achieving increasingly higher levels of information density and, consequently, presenting a greater amount of visual information to be perceived and understood by the operator, e.g., the pilot. It is important that visual displays provide a proper cognitive mapping between what the operator is trying to achieve and the information available to accomplish the task.

It is important for pilots to know the position of the aircraft which they are operating (referred to herein as their "own-ship") and the height of the surrounding terrain. Airport Moving Maps (AMM) are an overlay, for example, on a multi-function display/inertial navigation display (MFD/INAV), where terrain features like elevation are shown on the display. Depiction of the own-ship position reference point is extremely important.

Data driven charts (DDC) have a powerful ability to integrate chart information with aircraft position and flight management system (FMS) procedural routing. The minimum (or lowest) safe altitude is used in aviation to designate an altitude level deemed safe over a particular flight path or region. Generally, the minimum safe altitude is an altitude level that incorporates a safety buffer above the obstacles and/or terrain within a particular geographic region proximate to a route that an aircraft may travel. The minimum safe altitude is intended to ensure clearance over obstacles and terrain during flight.

Often, the minimum safe altitude is determined based on criteria provided by a governmental or regulatory organization. For example, in the United States, the Federal Aviation Administration defines criteria for the minimum safe altitude in the Federal Aviation Regulations. The regulations may provide a specific safety buffer for determining the minimum safe altitude, for example, an altitude of 1,000 feet above the highest obstacle within a horizontal distance of four nautical miles. By flying an aircraft at or above the minimum safe altitude, the pilot complies with the terrain and obstacle clearance requirements for the particular flight path.

However, there is a technical or functionality gap in current day avionics in providing timely procedure minimum altitude clearance information and alerting to the pilot. That is, when the flight management system (FMS) is programmed with a departure, arrival, en route jet airway, or instrument approach procedure there will be minimum altitudes that apply, for example, minimum en route altitude (MEA), minimum obstacle clearance altitude (MOCA), minimum crossing altitude (MCA), maximum authorized altitude (MAA), minimum holding altitude (MHA), minimum off route altitudes (MORA), and minimum reception altitude (MRA). MCA are displayed in the FMS legs page, but MOCA are not. MSA altitudes can be displayed within 25 nm of an aerodrome, but do not assist the pilot outside this 25 nm radius. The enhanced ground proximity warning system (EGPWS) is a 'last ditch' safe warning should the pilot descend below a safe altitude near terrain that typically requires an abrupt action on the part of the pilot.

This lack of obstruction clearance altitude awareness will be compounded in the future National Airspace System (NAS), when point-to-point RNAV (area navigation, or random navigation) routes will be the norm rather than the exception. This point-to-point clearance may be off route or without defined procedures. When the aircraft is flying in open airspace that is not defined by Victor or Jet Airways, or Instrument Procedures, there is not any display awareness for minimum obstruction clearance. Although many current aircraft are equipped with EGPWS, this is a terrain alerting system that warns of impending terrain closure and calls for aggressive maneuvering.

Figure 1:
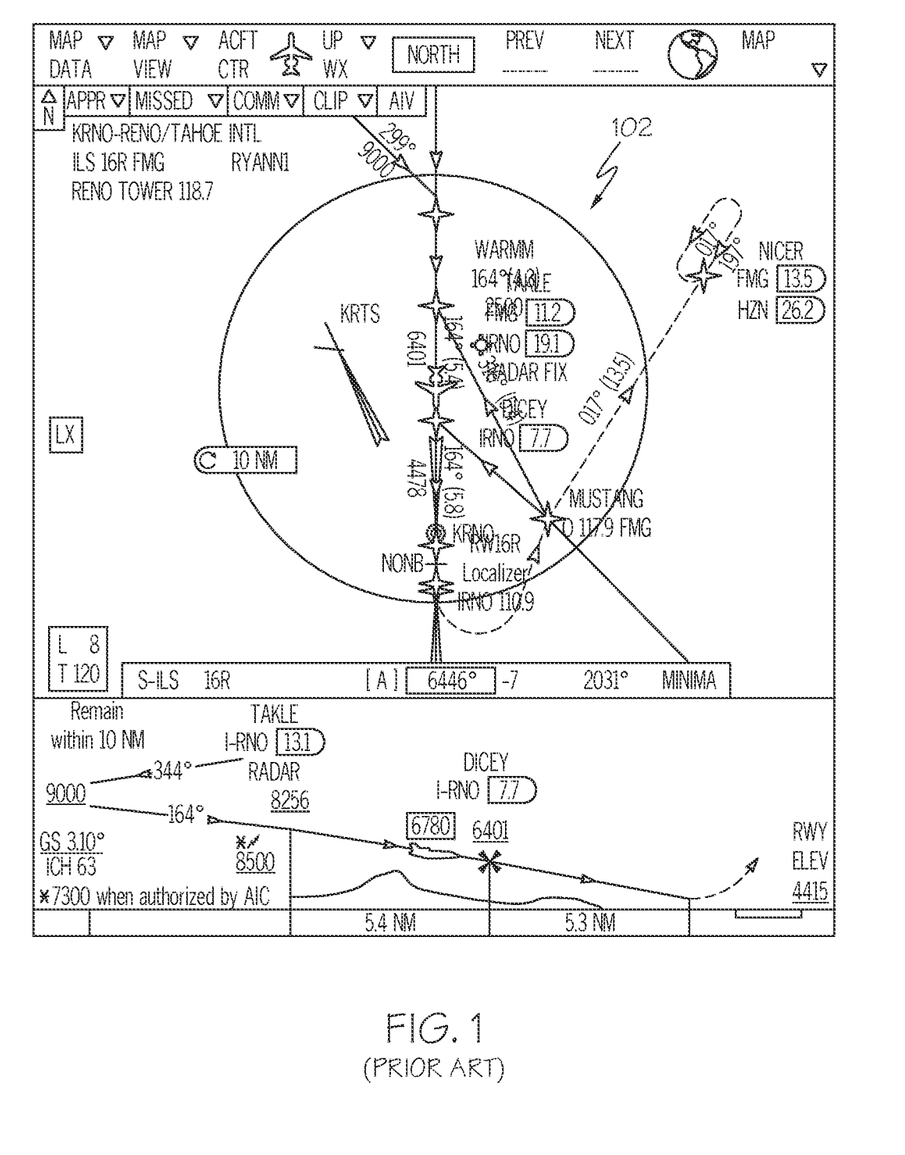
FIG. 1 is a schematic view of a known navigational map.

An airway can carry three or more altitude constraints: some for MRA, some for MCA, and some for MEA. See, for example, FIG. 1 illustrating the clutter 102 of information presented to the pilot upon executing a known procedure turn to an airport. To further complicate the situation, some segments require a step climb to be initiated when the next segment of the flight plan route is higher. Granted, most jets fly way above these altitudes and are just not concerned, in general. But lesser classes of aircraft, e.g., single or dual engine turboprops, and other general aviation complex piston aircraft, do not have the same level of performance and must be concerned.

Figure 2:
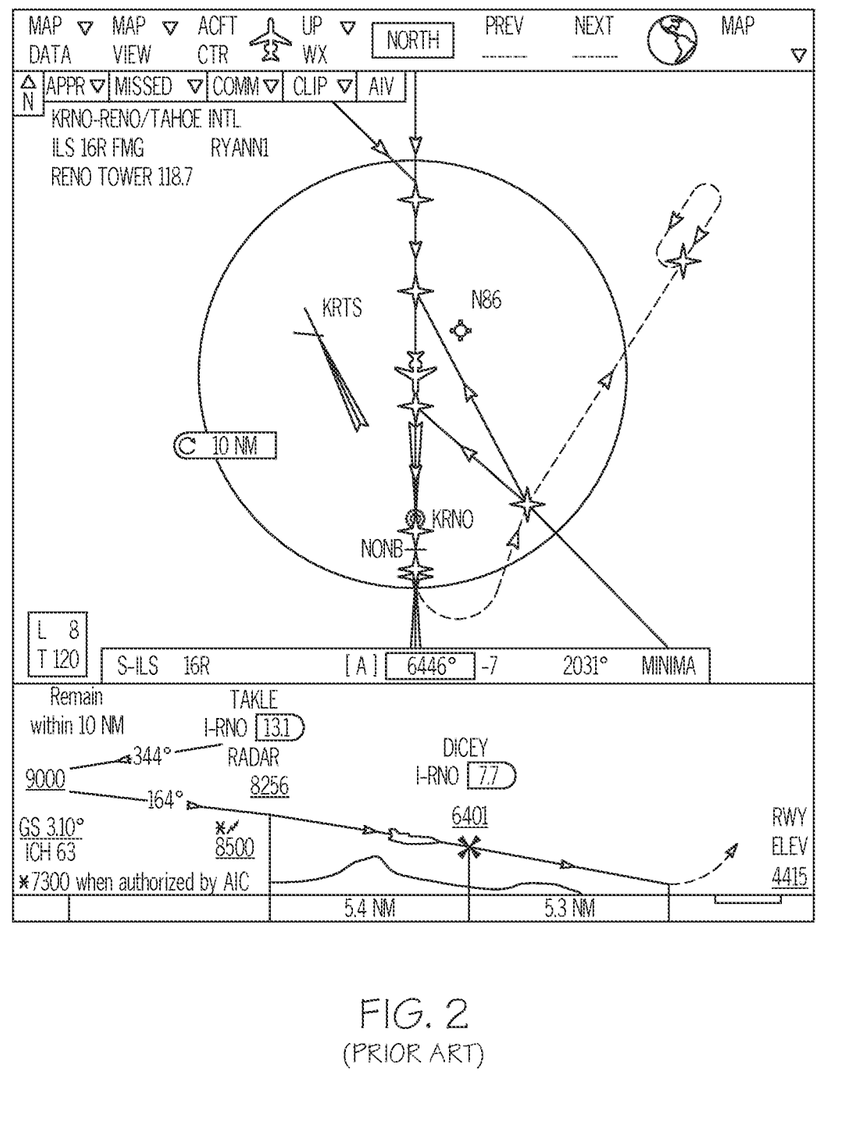
FIG. 2 is a schematic view of another known navigational map.

A pilot may have the option to display a more clear presentation by removing clutter for the course he is to fly as shown in FIG. 2; however, this removes data that may be pertinent to the pilot's flight plan.

Accordingly, it is desirable to provide a system and method for displaying general terrain clearance awareness, whether the aircraft is off route, on airway, off procedure, or on procedure, so altitude thresholds, for example, off route obstruction clearance altitudes (OROCA) and minimum off route altitudes (MORA), are not violated and EGPWS alerts are avoided, while reducing clutter in displaying the information. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for displaying general terrain clearance awareness so altitude thresholds are not violated, while reducing clutter in displaying the information.

In an exemplary embodiment, a method for displaying an indication that a threshold altitude will be exceeded by a flight path of an aircraft, the method comprising determining the flight path of the aircraft, the flight path including an aircraft position, an aircraft altitude, and a rate of change of aircraft altitude; determining a threshold altitude in the vicinity of the flight path that is not to be exceeded by the aircraft; providing the flight path as an output to a display; and highlighting the flight path in the output if the current flight path will exceed the threshold altitude.

In another exemplary embodiment, a method for displaying an indication that a threshold altitude will be exceeded by the flight path of an aircraft, the aircraft including a flight management system and a display, the method comprising determining the flight path of the aircraft by the flight management system, the current flight path including an aircraft position, an aircraft altitude, and a rate of change of aircraft altitude; determining by the flight management system a threshold altitude in the vicinity of the flight path that is not to be exceeded by the aircraft; displaying the flight path on the display, the display coupled to the flight management system; highlighting the displayed flight path on the display by the flight management system if the flight path will exceed the threshold altitude due to at least the rate of change of aircraft altitude; and displaying the threshold altitude only after it is determined that the current flight path will exceed the threshold altitude.

In yet another exemplary embodiment, a system for displaying an indication that a threshold altitude will be exceeded by the flight path of an aircraft, the system comprising a display configured to display the flight path; and a flight management system coupled to the display and configured to determine the flight path of the aircraft, the current flight path including an aircraft position, an aircraft altitude, and a rate of change of aircraft altitude; determine a threshold altitude in the vicinity of the flight path that is not to be exceeded by the aircraft; and highlight the displayed flight path if the flight path will exceed the threshold altitude.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The mapping methods described herein may be used with a variety of aircraft, such as planes and helicopters. The aviation environment is described herein as the exemplary embodiment and may include navigation from point to point or approach and landing or departure at an airport. Generally a top view display is presented in conjunction with the vertical view presented herein. Various types of maps may be used for display on the top view, for example, road maps, terrain maps, aviation maps, and topographical maps.

Some applications may require more than one monitor, for example, a head down display screen, to accomplish the mission. These monitors may include a two dimensional moving map display and a three dimensional perspective display. A moving map display may include a top-down view of the aircraft, the flight plan, and the surrounding environment. Various symbols are utilized to denote navigational cues (e.g., waypoint symbols, line segments interconnecting the waypoint symbols, range rings) and nearby environmental features (e.g., terrain, weather conditions, political boundaries, etc).

Alternate embodiments of the present invention to those described below may utilize whatever navigation system signals are available, for example a ground based navigational system, a GPS navigation aid, a flight management system, and an inertial navigation system, to dynamically calibrate and determine a precise course.

When a flight management system (FMS) flight plan, includes, for example, airways, decision points (DPs), standard terminal arrival route (STARS), standard instrument departures (SIDs), and instrument approach procedures (IAPs), data driven chart (DDC) data with minimum obstruction clearance altitudes, for example, minimum off route altitude (MORA), off route obstruction clearance altitude (OROCA), minimum en route altitude (MEA), maximum authorized altitude (MAA), and minimum reception altitude (MRA), and aircraft parameters, for example, barometric altitude, GPS altitude, ground speed, and ground tract, algorithms as described herein provide timely information that the aircraft is approaching an altitude limit (threshold) before it becomes a threat and triggers an EGPWS warning. Clutter on previously known displays is reduced by avoiding the display of limiting altitudes by the algorithms deterministically displaying altitudes and alerts only when the limiting altitude will be violated.

In a first exemplary embodiment, a flight path or a lateral alerting corridor is displayed around the aircraft's flight path using, for example, standard widths for airways or required navigation performance (RNP) widths where required. Warning trigger (threshold) altitudes can be defined with altitude bands below specific altitude limits. For instance if the aircraft is descending to an MEA on a jet airway and the descent rate jeopardizes a level off at the MEA, then the algorithm would trigger an advisory to the pilot by highlighting the lateral alerting corridor.

In a second exemplary embodiment, an off route area in which the aircraft is to fly is highlighted when the altitude within the area is a hazard for the current aircraft altitude and rate of change in altitude. In a third exemplary embodiment, the alerting corridor is highlighted if the aircraft will be flying above a maximum authorized altitude.

While the alerting corridor is highlighted in a fourth exemplary embodiment, an area, for example a triangle, is highlighted in a vertical display of the route illustrating an envelope in which the aircraft may fly while avoiding the altitude limitation. Points on the map may be indicated where the aircraft must change altitude to accomplish an optimum or maximum rate of change (climb or descent).

Figure 3:
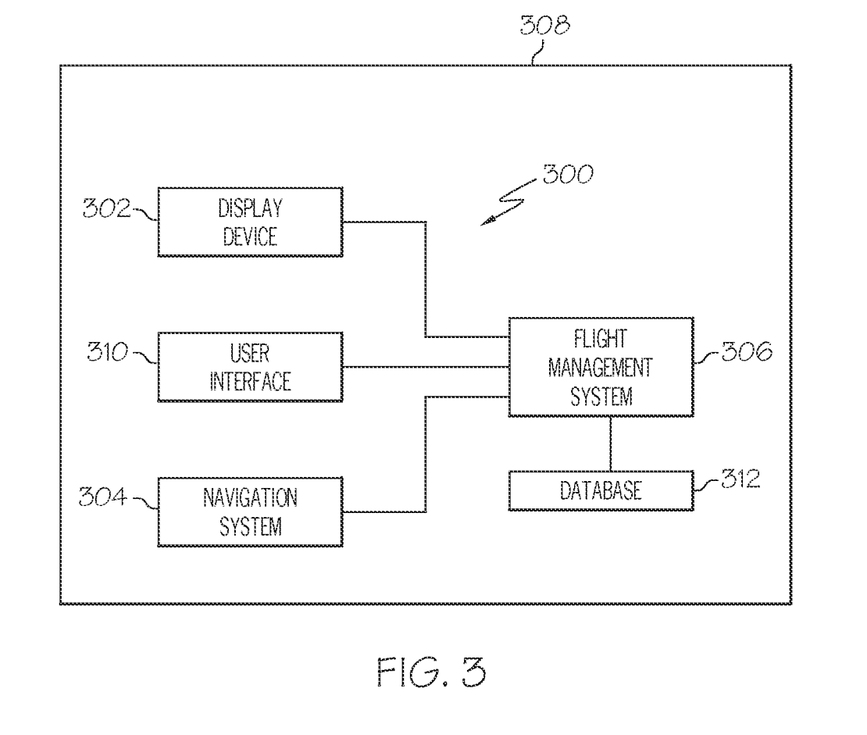
FIG. 3 is a block diagram of a display system suitable for use in an aircraft in accordance with one embodiment.

FIG. 3 depicts an exemplary embodiment of a display system 300, which may be located onboard aircraft 308. This embodiment of display system 300 may include, without limitation, a display device 302, a navigation system 304, and a flight management system 306 (FMS). The display system 300 may further include a user interface 310 for enabling interactivity with the display system 300. The display system 300 may also include a database 312 suitably configured to support operation of the display system 300 as described in greater detail below.

It should be understood that FIG. 3 is a simplified representation of a display system 300 for purposes of explanation and ease of description, and FIG. 3 is not intended to limit the application or scope of the subject matter in any way. In practice, the display system 300 and/or aircraft 308 will include numerous other devices and components for providing additional functions and features, as will be appreciated in the art.

In an exemplary embodiment, the display device 302 is coupled to the flight management system 306. The flight management system 306 is coupled to the navigation system 304 for obtaining real-time data and/or information regarding operation of the aircraft 308. The flight management system 306 is configured to display, render, or otherwise convey one or more graphical representations or images associated with operation of the aircraft 308 on the display device 302, as described in greater detail below. In accordance with one or more embodiments, the flight management system 306 is configured to determine and indicate on the display device 302 whether the aircraft 308 is violating, or will violate in view of current flight conditions, an altitude level for a given flight path. In this regard, the user interface 310 may be coupled to the flight management system 306 to allow a pilot and/or crew member to indicate and/or identify a desired navigational reference point, as described in greater detail below.

In an exemplary embodiment, the display device 302 is realized as an electronic display configured to graphically display flight information or other data associated with operation of the aircraft 308 under control of the flight management system 306, as will be understood. In an exemplary embodiment, the display device 302 is located within a cockpit of the aircraft 308. It will be appreciated that although FIG. 3 shows a single display device 302, in practice, additional display devices may be present onboard the aircraft 308. The user interface 310 may also be located within the cockpit of the aircraft 308 and adapted to allow a user (e.g., pilot, co-pilot, or crew member) to interact with the flight management system 306, as described in greater detail below. In various embodiments, the user interface 310 may be realized as a keypad, touchpad, keyboard, mouse, touchscreen, joystick, or another suitable device adapted to receive input from a user. In an exemplary embodiment, the user interface 310 and flight management system 306 are cooperatively configured to enable a user to indicate and/or select a desired navigational reference point, as described below.

The display 302 is configured to provide the enhanced images to the operator. In accordance with an exemplary embodiment, the display 302 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 302 may additionally be implemented as a panel mounted display, a HUD (head-up display) projection, or any one of numerous known technologies. It is additionally noted that the display 302 may be configured as any one of numerous types of aircraft flight deck displays. For example, it may be configured as a multi-function display, a horizontal situation indicator, or a vertical situation indicator. In the depicted embodiment, however, the display 302 is configured as a primary flight display (PFD).

In operation, the display device 302 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 302 is suitably designed to process data obtained from the sources of flight status data in the manner described in more detail herein. In particular, the display device 302 can use the flight status data of the host aircraft when rendering the display.

It should be appreciated that although FIG. 3 shows the display device 302 and user interface 310 within the aircraft 308, in practice, either or both may be located outside the aircraft 308 (e.g., on the ground as part of an air traffic control center or another command center) and communicatively coupled to the flight management system 306 over a data link. For example, the display device 302 and/or user interface 310 may communicate with the flight management system 306 using a radio communication system or another data link system, such as a controller pilot data link (CPDL).

In an exemplary embodiment, the navigation system 304 is configured to obtain one or more navigational parameters associated with operation of the aircraft 308. The navigation system 304 may be realized as a global positioning system (GPS), inertial reference system (IRS), or a radio-based navigation system (e.g., VHF omni-directional radio range (VOR) or long range aid to navigation (LORAN)), and may include one or more sensors suitably configured to support operation of the navigation system 304, as will be appreciated in the art. In this regard, navigation system 304 may communicate with one or more navigational aids, as will be understood. In an exemplary embodiment, the navigation system 304 is capable of obtaining and/or determining the current location of the aircraft 308 (e.g, the latitude and longitude) and the heading of the aircraft 308 (i.e., the direction the aircraft is traveling in relative to some reference) and providing these navigational parameters to the flight management system 306.

In an exemplary embodiment, the flight management system 306 (or, alternatively, a flight management computer) is located onboard the aircraft 308. Although FIG. 3 is a simplified representation of display system 300, in practice, the flight management system 306 may be coupled to one or more additional modules or components as necessary to support navigation, flight planning, and other aircraft control functions in a conventional manner. In an exemplary embodiment, the flight management system 306 is configured to obtain and/or determine the instantaneous altitude of the aircraft 308. In addition, the flight management system 306 may include or otherwise access a terrain database or other navigational information for rendering a navigational map on the display device 302, as described below. The navigational map may be based on one or more sectional charts, topographic maps, digital maps, or any other suitable commercial or military database or map, as will be appreciated in the art.

In an exemplary embodiment, the flight management system 306 accesses or includes a database 312 that contains designated minimum safe altitude and maximum safe distance information for a plurality of known procedure turns. The navigational reference points may comprise navigational aids, such as VHF omni-directional ranges (VORs), distance measuring equipment (DMEs), tactical air navigation aids (TACANs), and combinations thereof (e.g., VORTACs). As used herein, "navigational reference point" and variants thereof should also be understood as encompassing position fixes, such as initial approach fixes (IAFs), final approach fixes (FAFs) and other navigational reference points used in area navigation (RNAV). In an exemplary embodiment, the navigational reference points are located near a landing location (e.g., an airport). In this regard, the landing location and/or navigational reference point may have one or more associated approaches, wherein the designated minimum safe altitude may be displayed on a published chart or approach plate for the navigational reference point.

The databases 312 include various types of data representative of the terrain or obstacles over which the aircraft is flying, and the navigation systems 304 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. The databases 312 could also be part of a device or system that is physically separate from the system 300.

Figure 4:
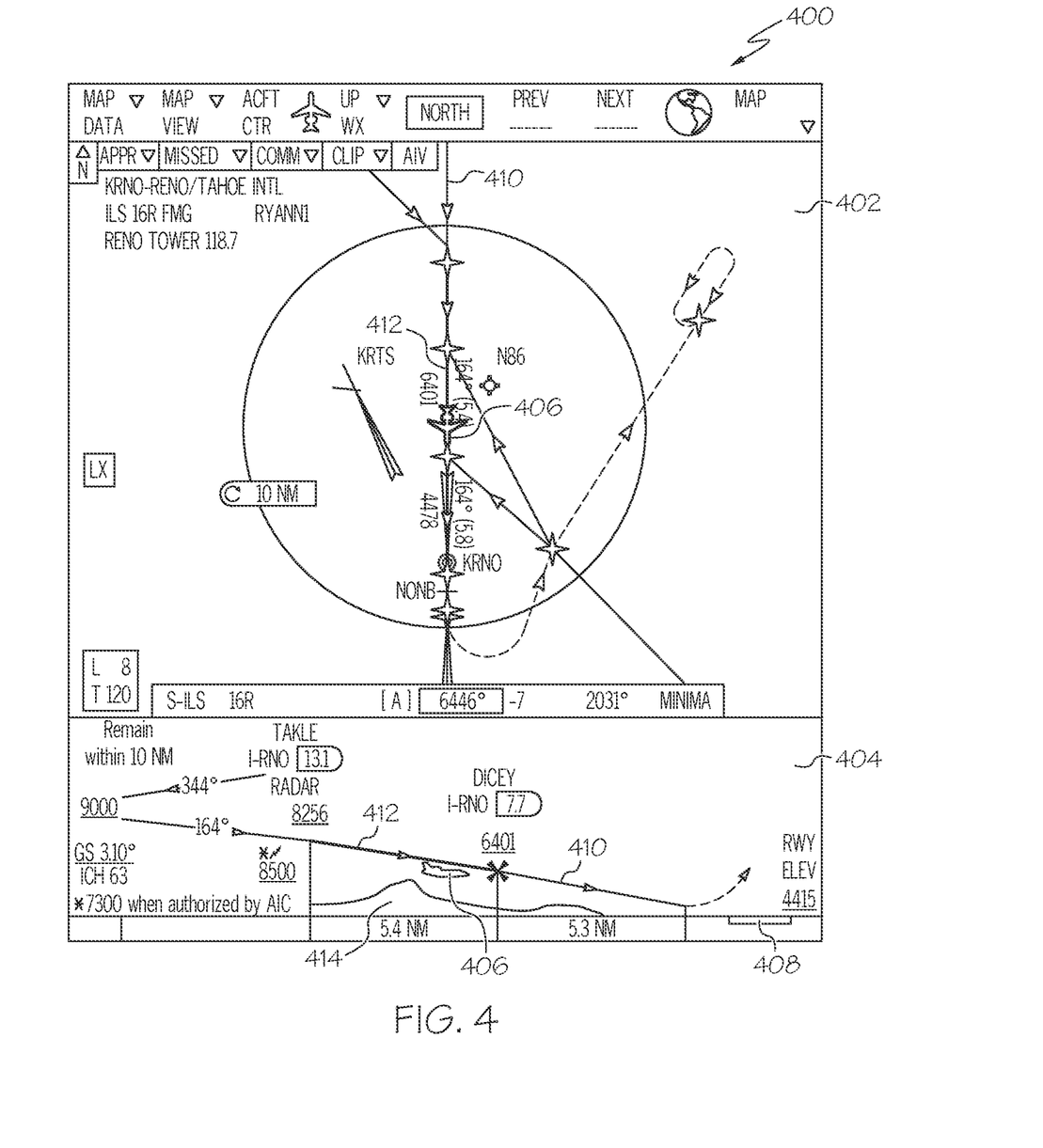
FIG. 4 is a schematic view of a navigational map in accordance with a first exemplary embodiment and suitable displayed by the display system of FIG. 3.

Referring to FIG. 4 and in accordance with a first exemplary embodiment, the display 400 includes a lateral representation 402 and a vertical representation 404. An aircraft 406 is executing an instrument approach into an airport 408. The instrument flight path 410 displayed by the flight management system 306 on the display 302 crosses the outer marker (identified as "DICEY") at 6401 feet. As shown in this example, the aircraft 406 is at about 6200 feet which is 201 feet below the instrument glide path 410, while a mountain 414 is shown, for emphasis, having a highest elevation of 5800 feet. Since the lowest altitude threshold for an instrument approach is the glide path altitude (which varies with the distance from the runway 408), the instrument approach segment 412 currently being flown by the aircraft 406 is highlighted, thereby alerting the pilot that he is violating the lower altitude threshold. Highlighted means that the selected item is differentiated from non-selected items. The highlighting may, for example, be a changed format, for example, color, brightness, or shape. Clutter of excessive information on the display is reduced by avoiding the display of limiting altitudes by the algorithms deterministically displaying altitudes and alerts only when the limiting altitude will be violated.

Figure 5:
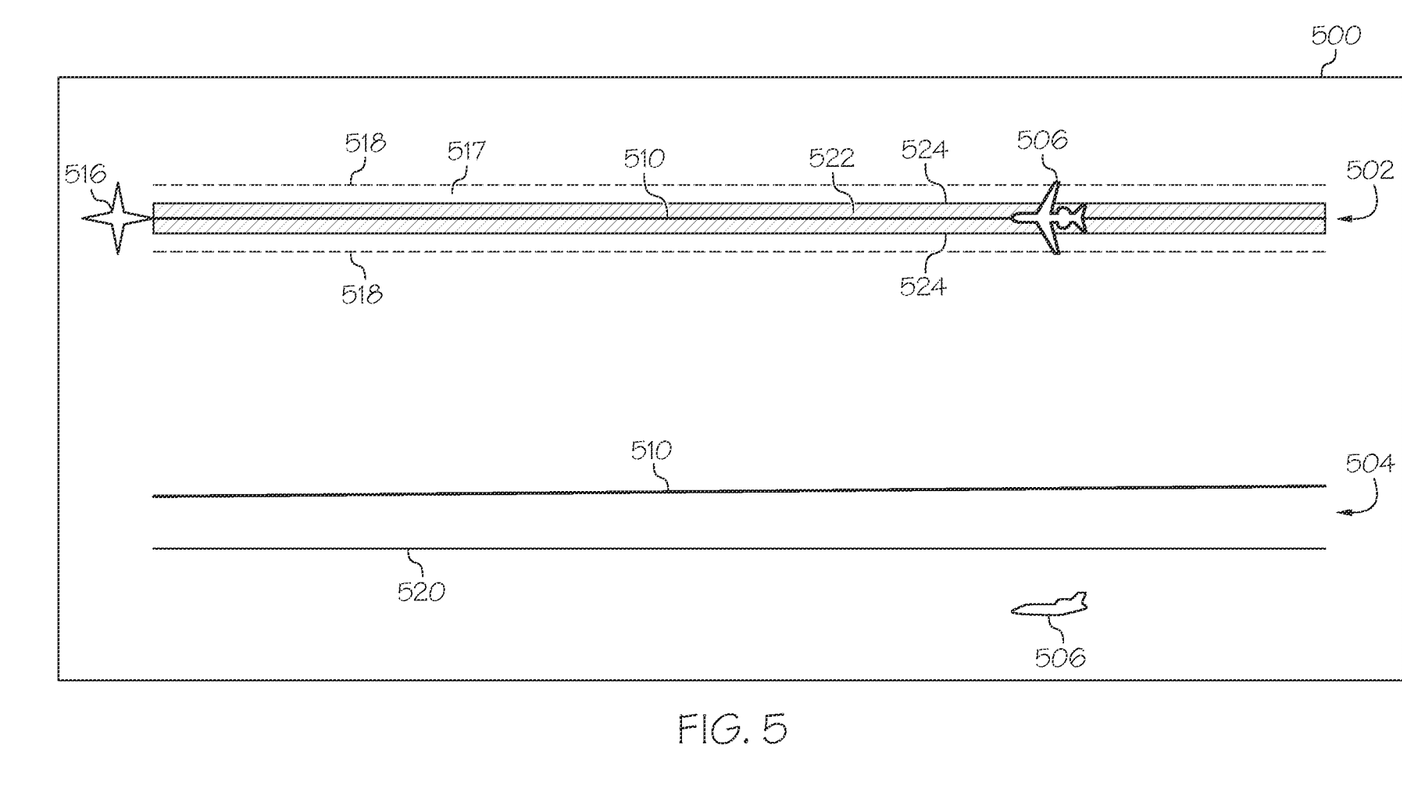
FIG. 5 is a simplified schematic view of the navigational map in accordance with a second exemplary embodiment.

A simplified second exemplary embodiment 500 of FIG. 5 includes a lateral representation 502 and a vertical representation 504 having an aircraft 506 flying on an en route airway 510 towards waypoint 516, with the airway 510 defining a corridor 517 having a MEA of, for example, 18000 feet, and having sides 518 in which the aircraft 506 is to remain. The corridor 517 typically is 4 miles wide between sides 518. A threshold altitude 520 is defined as, for example, 100 feet below the MEA altitude of 18000 feet. When the aircraft 506 goes below this threshold altitude 520, the airway 510 is highlighted, in this case by highlighting a strip 522 having sides 524 on both sides of the airway 510.

Figure 6:
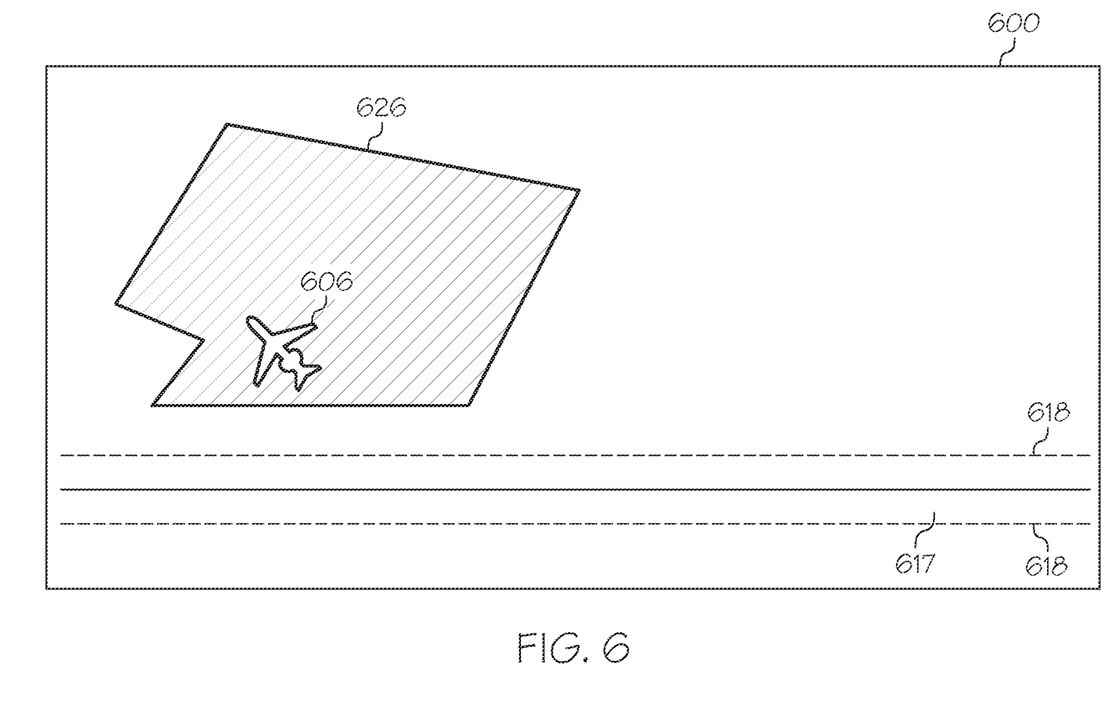
FIG. 6 is a simplified schematic view of a navigational map in accordance with a third exemplary embodiment.

FIG. 6 is a simplified third exemplary embodiment 600 of an aircraft 606 and an airway 617 having sides 618 similar to the airway 517 of FIG. 5 and at an altitude of 18000 feet, for example. However, the aircraft has deviated away from the airway 617, for example as instructed by air traffic control, into a defined area 626 having, for example, a MORA of 22000 feet. If the current altitude and climb rate does not allow the aircraft 606 to reach 22000 feet prior to entering the area 626, the displayed area 626 is highlighted. Clutter is reduced by displaying the area 626 only after it is determined by the algorithms that the area 626 will be traversed by the flight path and that the limiting altitude will not be met by the flight path into that area 626.

Figure 7:
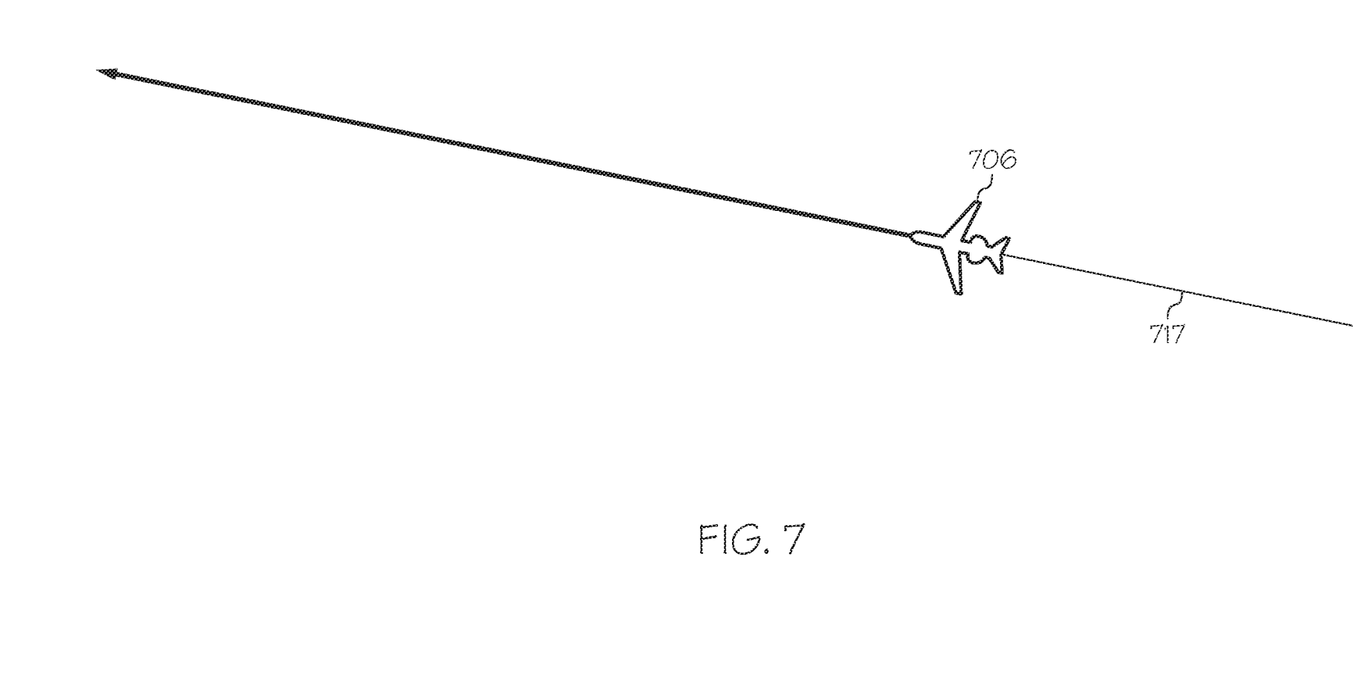
FIG. 7 is a simplified schematic view of a navigational map in accordance with a fourth exemplary embodiment.

Referring to FIG. 7, a fourth exemplary embodiment includes an aircraft 706 on an airway 717 at, for example, 40000 feet; however, the airway 717 has a MAA of 35000 feet. If the altitude and rate of descent does not allow the aircraft to be below 35000 at the appropriate location, the line designating the airway 717 is highlighted.

Figure 8:
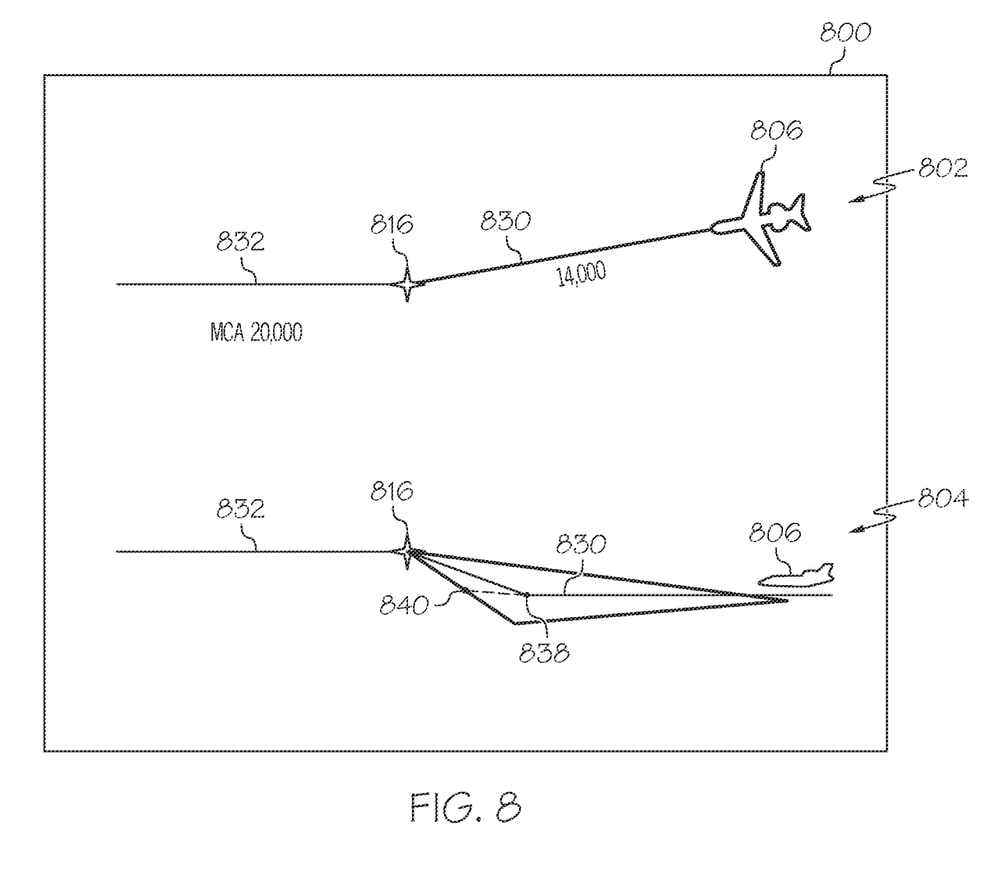
FIG. 8 is a simplified schematic view of a navigational map in accordance with a fifth exemplary embodiment.

A simplified fifth exemplary embodiment 800 of FIG. 8 includes a lateral representation 802 and a vertical representation 804. The planned flight route includes a first segment 830 with the aircraft 806 flying at, for example, 14000 feet and a waypoint 816 separating the first segment 830 and a second segment 832, having a MCA of, for example, 20000 feet. If the current altitude and rate of climb are not sufficient for the aircraft to reach the waypoint 816 at or above 20000 feet, the segment 830 of the lateral representation 802 current occupied by the aircraft 806 is highlighted. In the vertical representation 804, an area 836, for example, a triangle, is highlighted. Additionally, if the aircraft 806 rate of climb is insufficient to reach 20000 feet by the waypoint 816, location on the vertical display 804 may be identified, by the dots 838 and 840 for example, as locations where the aircraft 806 must initiate a claim at an optimum rate of climb (optimum use of fuel) and at a maximum rate of climb (best possible climb rate by the aircraft 806) to reach 20000 feet at the waypoint 816, respectively.

Figure 9:
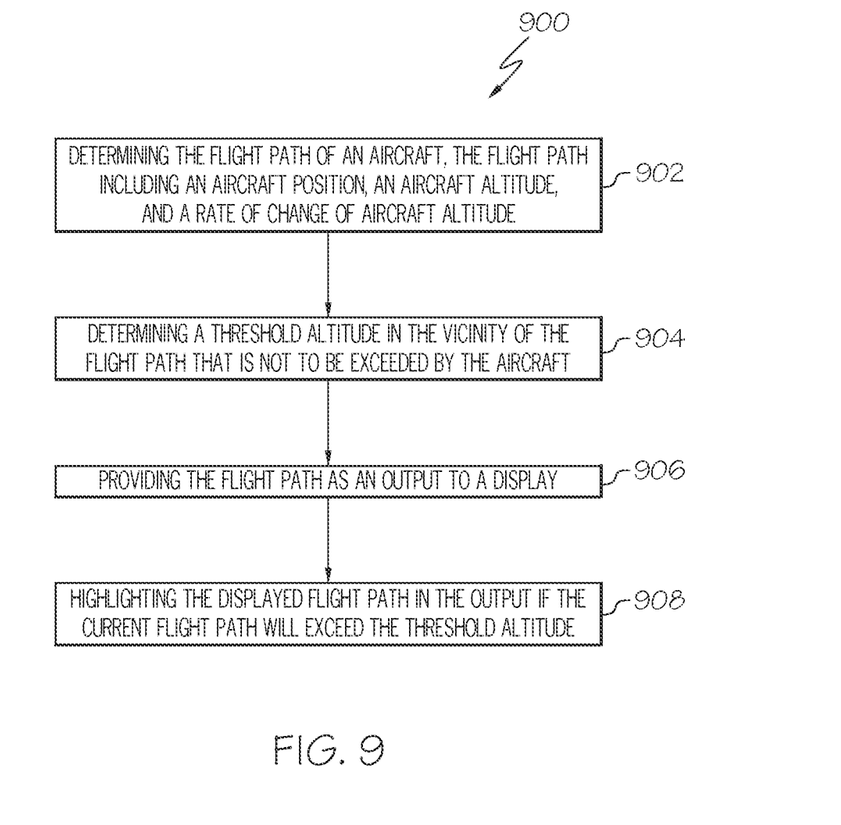
FIG. 9 is a flow diagram of a first exemplary method suitable for use with the display system of FIG. 3 in accordance with the exemplary embodiments.
Figure 10:
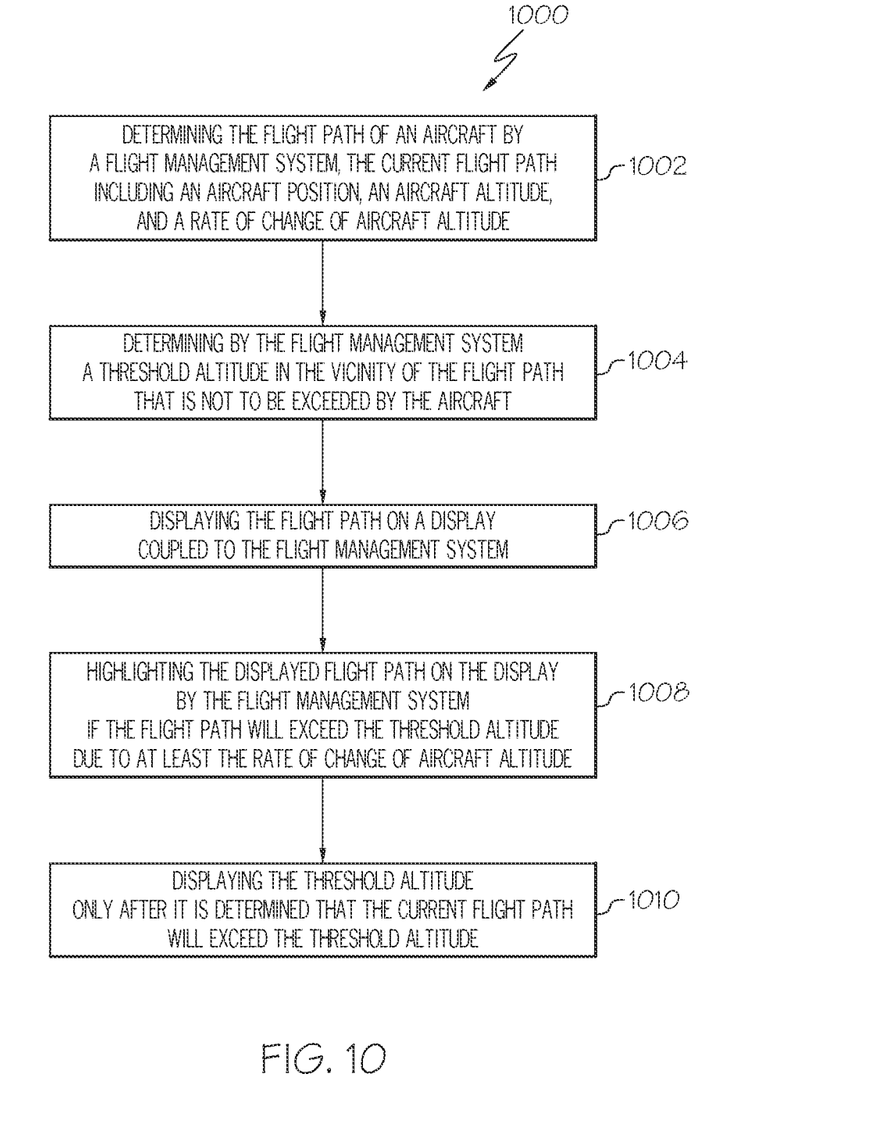
FIG. 10 is a flow diagram of a second exemplary method suitable for use with the display system of FIG. 3 in accordance with the exemplary embodiments.

FIGS. 9 and 10 are flow charts that illustrate exemplary embodiments of display methods 900, 1000 suitable for use with a flight deck display system such as the display system 200. Methods 900, 1000 represent implementations of methods for displaying aircraft traffic information on an onboard display element of a host aircraft. The various tasks performed in connection with methods 900, 1000 may be performed by software, hardware, firmware, or any combination thereof. For illustrative purposes, the following description of methods 900, 1000 may refer to elements mentioned above in connection with FIGS. 3-8. In practice, portions of methods 900, 1000 may be performed by different elements of the described system, e.g., a processor, a display element, or a data communication component. It should be appreciated that methods 900, 1000 may include any number of additional or alternative tasks, the tasks shown in FIGS. 9 and 10 need not be performed in the illustrated order, and methods 900, 1000 may be incorporated into a more comprehensive procedure or process having additional functionality not described in detail herein. Moreover, one or more of the tasks shown in FIGS. 9 and 10 could be omitted from an embodiment of the methods 900, 1000 as long as the intended overall functionality remains intact.

The exemplary method of FIG. 9 displays an indication that a threshold altitude will be exceeded by a flight path of an aircraft, by determining 902 the flight path of the aircraft, the flight path including an aircraft position, an aircraft altitude, and a rate of change of aircraft altitude, determining 904 a threshold altitude in the vicinity of the flight path that is not to be exceeded by the aircraft; displaying 906 the flight path on a display; and highlighting 908 the displayed flight path if the current flight path will exceed the threshold altitude.

The exemplary method of FIG. 10 displays a method for displaying an indication that a threshold altitude will be exceeded by the flight path of an aircraft, the aircraft including a flight management system and a display, the method including determining 1002 the flight path of the aircraft by the flight management system, the current flight path including an aircraft position, an aircraft altitude, and a rate of change of aircraft altitude; determining 1004 by the flight management system a threshold altitude in the vicinity of the flight path that is not to be exceeded by the aircraft; displaying 1006 the flight path on the display, the display coupled to the flight management system; highlighting 1008 the displayed flight path on the display by the flight management system if the flight path will exceed the threshold altitude due to at least the rate of change of aircraft altitude; and displaying 1010 the threshold altitude only after it is determined that the current flight path will exceed the threshold altitude.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for displaying an indication that a threshold altitude will be exceeded by a flight path of an aircraft, the method comprising:
    determining the flight path of the aircraft by a management system, the flight path including an aircraft position, an aircraft altitude, an aircraft ground speed, and a rate of change of aircraft altitude;
    determining by the management system a threshold altitude in the vicinity of the flight path that is not to be exceeded by the aircraft, wherein the threshold altitude consists of at least one of the group selected from minimum off route altitude (MORA), minimum crossing altitude (MCA), minimum obstacle clearance altitude (MOCA), off route obstruction clearance altitude (OROCA), minimum en route altitude (MEA), maximum authorized altitude (MAA), minimum holding altitude (MHA), and minimum reception altitude (MRA);
    providing the flight path as an output to a display; and
    highlighting the flight path in the output on the display if the current flight path will exceed the threshold altitude.

2. The method of claim 1 further comprising:
    providing the threshold altitude as the output to the display only after it is determined that the current flight path will exceed the threshold altitude.

3. The method of claim 1 wherein the threshold altitude is a maximum altitude above which the aircraft is to avoid.

4. The method of claim 1 wherein the threshold altitude is in an area in which the aircraft has been directed to fly, the method further comprising:
    highlighting on the display the area if a modified flight path within the area will exceed the threshold altitude.

5. The method of claim 4 further comprising:
    providing the area as the output for the display only after it is determined that the flight path will intersect the area.

6. The method of claim 1 further comprising:
    determining the maximum altitude rate of change of the aircraft; and
    advising the aircrew of the aircraft when the aircraft must assume that maximum altitude rate of change to reach the threshold altitude.

7. The method of claim 1 further comprising:
    determining the optimum altitude rate of change of the aircraft; and
    advising the aircrew when the aircraft must assume the optimum altitude rate of change to reach the threshold altitude.

8. A method for displaying an indication that a threshold altitude will be exceeded by the flight path of an aircraft, the aircraft including a flight management system and a display, the method comprising:
    determining the flight path of the aircraft by the flight management system, the current flight path including an aircraft position, an aircraft altitude, an aircraft ground speed, and a rate of change of aircraft altitude;
    determining by the flight management system a threshold altitude in the vicinity of the flight path that is not to be exceeded by the aircraft, wherein the threshold altitude consists of at least one of the group selected from minimum off route altitude (MORA), minimum crossing altitude (MCA), minimum obstacle clearance altitude (MOCA), off route obstruction clearance altitude (OROCA), minimum en route altitude (MEA), maximum authorized altitude (MAA), minimum holding altitude (MHA), and minimum reception altitude (MRA);

displaying the flight path on the display, the display coupled to the flight management system;

highlighting the displayed flight path on the display by the flight management system if the flight path will exceed the threshold altitude due to at least the rate of change of aircraft altitude; and displaying the threshold altitude only after it is determined that the current flight path will exceed the threshold altitude.

9. The method of claim 8 further comprising:

determining the maximum altitude rate of change of the aircraft; and advising the aircrew of the aircraft when the aircraft must assume that maximum altitude rate of change to reach the threshold altitude.

10. The method of claim 8 further comprising:

determining the optimum altitude rate of change of the aircraft; and advising the aircrew when the aircraft must assume the optimum altitude rate of change to reach the threshold altitude.

11. A system for displaying an indication that a threshold altitude will be exceeded by the flight path of an aircraft, the system comprising:

a display configured to:
  display the flight path; and
a flight management system coupled to the display and configured to:
  determine the flight path of the aircraft, the current flight path including an aircraft position, an aircraft altitude, an aircraft ground speed, and a rate of change of aircraft altitude;
  determine a threshold altitude in the vicinity of the flight path that is not to be exceeded by the aircraft, wherein the threshold altitude consists of at least one of the group selected from minimum off route altitude (MORA), minimum crossing altitude (MCA), minimum obstacle clearance altitude (MOCA), off route obstruction clearance altitude (OROCA), minimum en route altitude (MEA), maximum authorized altitude (MAA), minimum holding altitude (MHA), and minimum reception altitude (MRA); and
  highlight the displayed flight path if the flight path will exceed the threshold altitude.

12. The system of claim 11 wherein the flight management system is further configured to:

determine the threshold altitude as a maximum altitude above which the aircraft is to avoid.

13. The system of claim 11 wherein the threshold altitude is in an area in which the aircraft has been directed to fly, and the flight management system is further configured to:

highlight the area if a modified flight path within the area will exceed the threshold altitude.

14. The system of claim 11 wherein the flight management system is further configured to:

determine the maximum altitude rate of change of the aircraft; and advise the aircrew of the aircraft when the aircraft must assume that maximum altitude rate of change to reach the threshold altitude.

15. The system of claim 11 wherein the flight management system is further configured to:

determine the optimum altitude rate of change of the aircraft; and advise the aircrew when the aircraft must assume the optimum altitude rate of change to reach the threshold altitude.

16. The system of claim 11 wherein the flight management system is further configured to:

display the threshold altitude only after it is determined that the current flight path will exceed the threshold altitude.

* * * * *